United States Patent [19]

Keyes et al.

[11] Patent Number: 4,524,916
[45] Date of Patent: Jun. 25, 1985

[54] DISPERSING MACHINE FOR LARGE BALES

[75] Inventors: Richard E. Keyes; John W. Dirksing, both of Cincinnati, Ohio

[73] Assignee: Finn Corporation, Cincinnati, Ohio

[21] Appl. No.: 472,971

[22] Filed: Mar. 7, 1983

[51] Int. Cl.³ .............................................. B02C 21/02
[52] U.S. Cl. ............................. 241/101 A; 241/101.7; 241/186.4; 241/223; 241/243
[58] Field of Search ............... 241/89.1, 101 A, 101.7, 241/186 R, 186.4, 194, 222, 223, 243

[56] References Cited

U.S. PATENT DOCUMENTS

| | | | |
|---|---|---|---|
| 4,087,051 | 5/1978 | Moeller | 241/194 X |
| 4,101,081 | 7/1978 | Ritter et al. | 241/101.7 |
| 4,162,767 | 7/1979 | Hahn | 241/186 R X |
| 4,195,958 | 4/1980 | Vahlkamp et al. | 414/24.6 |
| 4,218,022 | 8/1980 | Boehm et al. | 241/101.7 |
| 4,266,899 | 5/1981 | Skeem | 414/24.6 |
| 4,360,167 | 11/1982 | Beccalori et al. | 241/101.7 X |
| 4,364,526 | 12/1982 | White | 241/101.7 X |
| 4,449,672 | 5/1984 | Morlock et al. | 241/101.7 |

FOREIGN PATENT DOCUMENTS 2101882  1/1983  United Kingdom ........... 241/101 A

OTHER PUBLICATIONS

Brochure; Haybuster Big Bale Buster, Jan. 1982.
Brochure; Hesston; Stakmover and Stakfeeder Models, Stakprocessor and Round Bale Movers, Jun. 1977.
Brochure; XG40, Framhands New Mid-sized Tub Grinder, Jan. 1981.

Primary Examiner—Howard N. Goldberg
Assistant Examiner—Timothy V. Eley
Attorney, Agent, or Firm—Frost & Jacobs

[57] ABSTRACT

A self-loading machine for dispersing material contained in large bales. The machine has a generally trough shaped body with a movable side which lowers to engage a bale and raises to load the bale into the machine. A cylindrical rotor is made up of a series of plates having hammers which are pivotally attached at alternate locations between the plates. The machine is also provided with a conveyor which, in conjunction with the action of the rotor, serves to tumble a round bale as material is removed and peel off material from the bottom of a rectangular bale. As material is removed from the bale, it is mixed with air generated by the rotor and discharged in a uniform stream at high velocity from the machine.

15 Claims, 8 Drawing Figures

DISPERSING MACHINE FOR LARGE BALES

BACKGROUND OF THE INVENTION

1. Field of the Invention

The present invention relates generally to apparatus for dispersing baled mulching material, and more particularly, to a self-loading apparatus for dispersing large bales of material.

2. Description of the Prior Art

Various types of construction projects, especially surface mine reclamation, require extensive soil movement. As a result, large areas of soil are void of vegetation and subject to the elements of nature, such as wind and rain, which can cause significant erosion. To aid in reclaiming this land, i.e., maintaining the surface integrity and beautifying the landscape, various methods and apparatus have been developed to cover the exposed land surface with seed and a mulching material, such as straw, hay or bark-wood fiber. The effects of such mulching materials are to impede water run-off from rainfall, to provide a protective barrier against winds, and to retain moisture in the ground which promotes growth of vegetation.

Apparatus which break up and scatter mulching material are relatively common in the prior art. However, such devices have been limited in the size of bales of mulching material which they will accept. Typically, the bales are either cylindrical, being no larger than about 2' in diameter and 3' long, or rectangular, no larger than about 18"×24" at the end and 3' long.

In recent years, it has become increasingly popular to bind material in bales in the shape of relatively large cylinders, commonly referred to as round bales. These large, round bales, which may be up to 6' in diameter, 6' long and 2200 pounds in weight, first gained acceptance in farming applications, such as baling hay for livestock. Use of this type of bale means that fewer bales are scattered widely throughout the fields, and that bales may be left in the field for cattle, since there is less bale spoilage. This is so because, typically, when a bale exits the baling machine it rolls to the ground and comes to rest on its circumference, which provides a rounded surface at the top of the bale, facilitating water run-off and thus keeping the hay dryer and less prone to spoilage.

Large rectangular bales, generally 4'×4'×8', are also becoming more widely used. This bale configuration is used primarily in the Western states where the baled material must frequently be transported great distances. The rectangular shape allows a greater amount of material to be loaded more easily onto a truck bed.

Since the use of large bales has been primarily limited to agricultural applications, prior art devices which handle and disperse such bales have been directed to the same market. Generally, such structures merely break up the bale for easier feeding of the livestock and distribute the material rather slowly and unevenly (clumped), often incorporating a conveyor to facilitate transfer of the material to a feed lot or windrow in the field. In addition, since these machines only spread one or a very few bales at a time, they generally do not incorporate means for loading and, in fact, are frequently difficult to load.

In summary, prior art structures which break up large bales are only equipped for very limited distribution of baled material, and are totally unsuited for use in land reclamation where it is necessary to break up the material and scatter it evenly and quickly over a large area. In addition, since reclamation efforts generally require the spreading of a large amount of mulching material; a dispersing machine must be easily loaded and, for large bales, it is preferably self-loading.

SUMMARY OF THE INVENTION

The dispersing machine of the present invention is particularly adapted for self-loading of a large bale of mulching material, breaking up that material and scattering it evenly over a large area. The machine is generally trough-shaped with one side being movable between a lowered, pick-up position and a raised, loaded position. At the bottom of the trough-shaped machine, lies a rotor beneath a grate. The rotor is essentially cylindrical in shape, being made up of a series of spaced, flat plates. Hammers are pivotally positioned between the plates and extend through the slots of the grate when the rotor is in motion to break up that portion of the bale immediately above the grate, mix the material with air and cause the material to discharge from the machine.

Preferably, the movable side panel is provided with a conveyor which causes a round bale to rotate in the machine over the rotor and allow the hammers to remove a uniform layer from the circumference of the bale; for a rectangular bale the conveyor peels off the bottom layer of the bale and advances it into the rotor.

The dispersing machine of the present invention is particularly suited for land reclamation. Since the machine uses large bales, it requires less frequent loading than equipment using the conventional size, smaller bales and, when loading is required, the machine is capable of loading itself. In addition, the rotor construction creates a uniform mixture of air and material which it discharges at high velocity, enabling distribution of the material over a large area in a short time.

BRIEF DESCRIPTION OF THE DRAWINGS

FIG. 3 is an exploded view of the dispersing machine, as seen from the rear, showing the side panel in its lowered position.

DESCRIPTION OF THE PREFERRED EMBODIMENT

Figure 1:
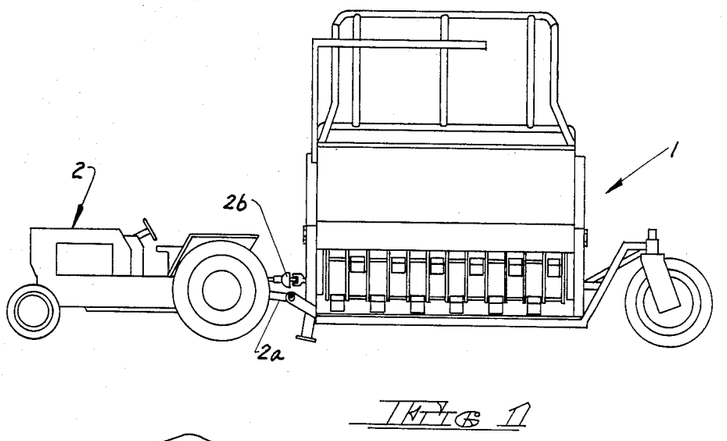
FIG. 1 is a side elevational view of the dispersing machine of the present invention, showing attachment of the machine to a tractor.

Illustrated in the FIGURES, indicated generally at 1, is a dispersing machine as taught by the present invention. Referring to FIG. 1, operation of the dispersing machine 1, as will be more fully discussed hereinafter, requires attachment to a conventional farm tractor 2. The tractor 2 moves the machine 1 over the area where it is used, and provides the power input as required for actual use of the machine 1.

Figure 2:
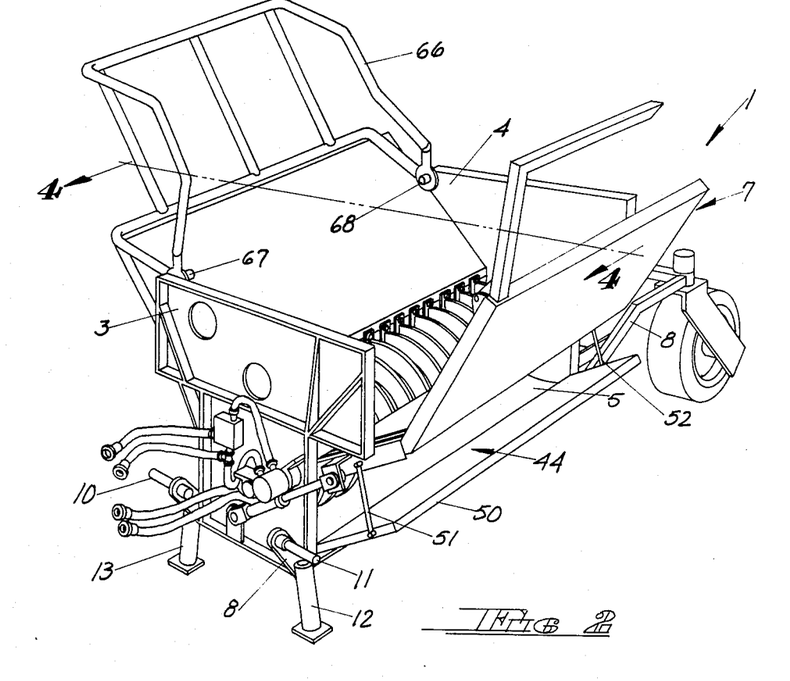
FIG. 2 is a perspective view of the dispersing machine as seen from the front.

As seen in greater detail in FIGS. 2 and 3, the dispersing machine 1 has an essentially trough-shaped body formed by a front end 3, a rear end 4, a bottom 5, a stationary side 6 and a movable side 7. As shown, the respective ends 3 and 4 are essentially vertical, while the sides 6 and 7 are somewhat inclined or V-shaped to provide the trough configuration. The bottom 5 is curved upwardly near the discharge and where it joins with the stationary side 6 to enhance the flow characteristics of the machine, as is evident by referring to FIG. 3 and 4. The movable side 7 is positionable; its function and specific structure will be explained in greater detail hereinafter.

To support and unify the various body portions, the machine 1 is provided with an extensive framework 8. Connections 10 and 11 are provided in the framework 8 as hookup points for a conventional tractor hitch; in addition, stands 12 and 13 are provided to support the front of the machine when it is not connected to a tractor. The framework 8 is also extended at the rear of the machine 1 to provide for the attachment of wheels 14 and 15. Specifically, bores 16 and 17 are provided on outside corners of the framework 8 and are adapted to receive pin connections 18 and 19 of respective wheel mounting brackets 20 and 21. Axles 22 and 23 are provided on the brackets 20 and 21, respectively, and provide the attachment point for the wheels 14 and 15. If desired, appropriate caps 24 and 25 can be used to cover the bores 16 and 17 and corresponding pin connections 18 and 19.

Figure 4:
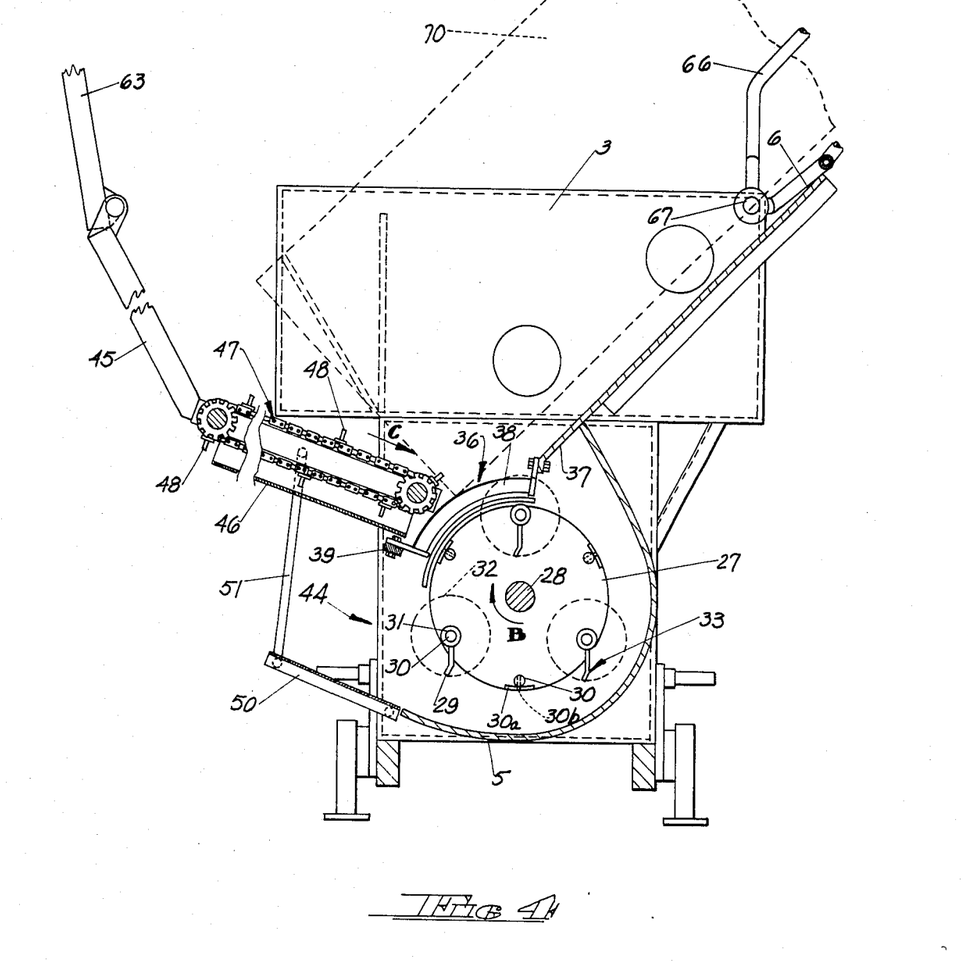
FIG. 4 is a fragmentary sectional view taken along the line 4—4 of FIG. 2.

Located centrally and near the bottom 5 of the machine 1 is a rotor 26, the position of which is most clearly shown in FIG. 4. Referring back to FIG. 3, it can be seen that the rotor 26 is made up of a series of flat plates 27 which are uniformly spaced and attached to a central shaft 28, giving the rotor 26 an overall cylindrical appearance. To provide for attachment of flails or rotating hammers 29 to the rotor 26, tie rods 30 extend through adjacent plates 27 at locations equally spaced about the periphery of the plates 27. Preferably, the rods 30 are removable to facilitate replacement of the hammers 29, when necessary; for this reason, conventional fastening means are provided at each end of the rods 30, such as an ear 30a welded to the plate 27 and a bolt 30b extending through the ear 30a and into the rod 30, as shown.

Figure 7:
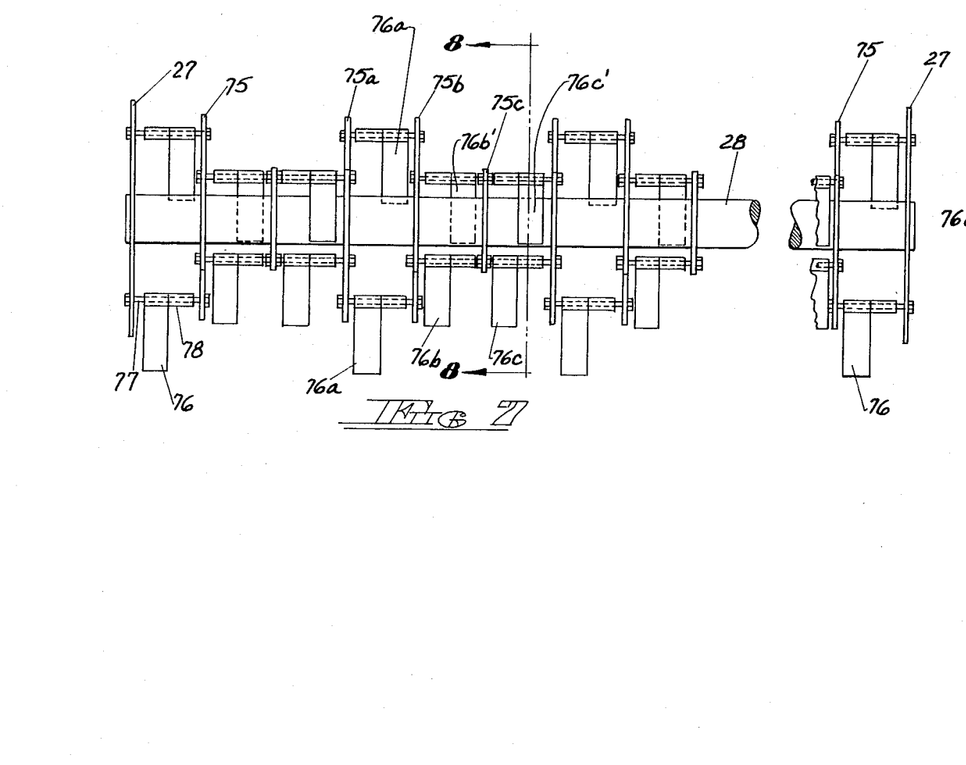
FIG. 7 is a side elevational view of an alternative embodiment for the rotor of the dispersing machine.
Figure 8:
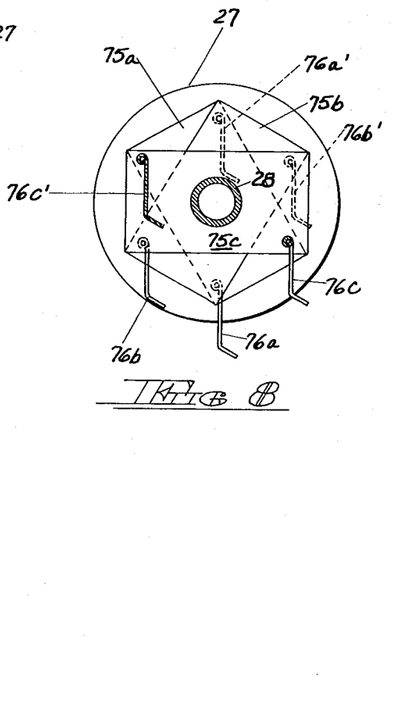
FIG. 8 is a sectional view taken along the line 8—8 of FIG. 7.

As seen in the section view of FIG. 4, each hammer 29 has a bore 31 through which the tie rod 30 passes; this type of pivotal attachment allows the hammers 29 to move through 360° as indicated by the broken lines at 32. If desired, however, the hammers 29 can be longer, as shown in FIGS. 7 and 8. Although the greater length prevents the 360° movement and requires a different rotor configuration and greater power input, it increases the discharge rate from the machine and facilitates breaking up tougher material, such as weedy hay. In addition, each hammer 29 is bent slightly, as indicated at 33 to enhance its effectiveness in breaking up the bale and generating a high velocity discharge.

Preferably, there are three tie rods 30 and hammers 29 located between adjacent plates 27. It is also preferable that the hammers 29 be alternated axially. More specifically, with reference to FIG. 3, tie rods 30 and hammers 29 for the pair of plates 27a and 27b would be, for example, at positions corresponding to 12 o'clock, 4 o'clock and 8 o'clock; the positions between plates 27b and 27c would be 2 o'clock, 6 o'clock and 10 o'clock; the next set would be the same as between plates 27a and 27b; etc. This type of rotor construction has been found to work well, providing an effective means for breaking apart the mulching material, generating sufficient air flow to mix with the material and providing proper balance. It should be noted that each end of the rotor shaft 28 is supported by appropriate bearings 34 and 35 in the ends 3 and 4, respectively.

As indicated previously, an alternative structure for the rotor 26 is required when hammers of greater length are desired. Although the rotor 26 uses plates 27 at each end, the new structure requires rectangular plates 75 at evenly spaced intervals along the shaft 28 and rotated 60° with respect to the adjacent plate 75, as shown in FIGS. 7 and 8. The relationship of the plates 75 can be best seen in FIG. 8. Beginning with the position of plate 75a as shown, the next plate 75b is rotated 60° clockwise with respect to plate 75a and plate 75c is likewise oriented 60° clockwise with respect to plate 75b. This arrangement is repeated for all of the rectangular plates 75. Between adjacent plates there are two elongated hammers 76 mounted 180° apart on bolts 77 to give the configuration of hammers 76 shown in FIG. 8. To prevent possible interference between the hammers 76, each hammer is positioned away from one of the plates by a spacer 78. More specifically, between plates 75a and 75b, it is preferable to space hammer 76a away from plate 75b and hammer 76a' away from plate 75a. Similarly, hammer 76b is spaced away from plate 75c while hammer 76b' is spaced away from plate 75b. In like manner each pair of hammers 76 in the rotor 26 is similarly mounted. This structure for the rotor 26 is particularly effective in breaking up the tougher types of mulching material.

Overlying the rotor 26 is a grate 36 made up of an elongated upper plate 37, a series of bars 38 and a lower support rod 39. The bars 38 are flat, edge bent steel and are positioned so that each overlies a corresponding plate 27 in the rotor 26; each bar 38 is removably connected to the upper plate 37 and support rod 39. The arrangement of the bars 38 provides sufficient clearance to permit the hammers 29 to pass between the bars 38 and contact material which is above the grate 36. In addition, it has been found advantageous to curve the bars 38, as indicated at 40, so that they follow the shape of the rotor 26. It is preferred that the bars 38 are removably attached so that appropriate shims or spacers may be added, if desired, and the distance between the grate 36 and the rotor 26 can be varied. This in turn varies the amount of material which will be removed from the bales by the hammers 29.

The movable side wall 7 is pivotally connected at bearings 42 and 43 in the respective ends 3 and 4. The point of attachment of the wall 7 is a fixed distance above the bottom 5 which forms an opening, generally indicated at 44 (FIG. 4), which in actuality is the discharge opening for the mulching material as will be more fully described hereinafter. To facilitate the handling of a large round bale, the movable side 7 preferably has an outer panel 45 and an inner panel 46 which are joined together at an angle between about 150° and 120°. In addition, as will be more fully discussed hereinafter, it is preferable that the inner panel 46 include a conveyor 47, having projections 48 which engage the bale material, and an external power source, such as a hydraulic motor 49, to provide the desired rotational movement for round bales and removal of layers of material from the rectangular bale. A rectangular deflector panel 50 is connected to the inner panel 46 by links 51 and 52. The deflector 50 and inner panel 46 of the movable side 7 provide a discharge chute for the mulching material, as will be more fully discussed hereinafter.

Adjustment in the movable side 7 is accomplished by any conventional means, such as a hydraulic cylinder 53 which mounts at one point to a base bracket 54 attached to the framework 8 and an outer bracket 55 mounted to the movable side 7. A piston moves within the cylinder 53 in the direction of arrow A to position the movable side 7 between the raised position shown in FIG. 5 and the lowered position shown in FIG. 6, as will be more fully discussed hereinafter. Power to the cylinder 53 can be supplied by the tractor 2; preferably, suitable connections 56 and 57 are provided from the tractor 2 to the hydraulic cylinder 53. As shown in the FIGURES, hydraulic circuitry can also be connected to an adjustable flow control 58 and the hydraulic motor 49, as by connections 61 and 62, to power the conveyor 47.

The movable side 7 is also equipped with a pick up arm 63 to assist in loading a bale of material. Preferably, the pick up arm 63 is an L-shaped element which is pivotally connected to the movable side 7, as clearly shown in FIG. 3. When in use, the arm is extended to the position shown in FIGS. 3, 5 and 6; when not in use, the arm 63 is in a downward, stowed position as shown by the broken lines at 64 in FIG. 5. The specific function of the pick up arm 63 is set forth in greater detail in the discussion of the operation of the dispersing machine 1.

To facilitate holding and guiding the large rectangular bales, the dispersing machine 1 is provided with a rack 66 adjacent to and extending above the stationary side 6. The rack 66 is preferably fabricated from tubular steel into the configuration shown which serves to cradle the bale as it rides in the machine. Preferably, the rack 66 is pivotally attached at 67 and 68 on the ends 3 and 4, respectively. This method of attachment allows easy removal when the rack 66 is not required, although both round and rectangular bales can be dispersed with the rack 66 attached. In addition, the rack 66 may be pivoted to a stowed position for traveling as shown by the broken line at 69 in FIG. 5.

Figure 5:
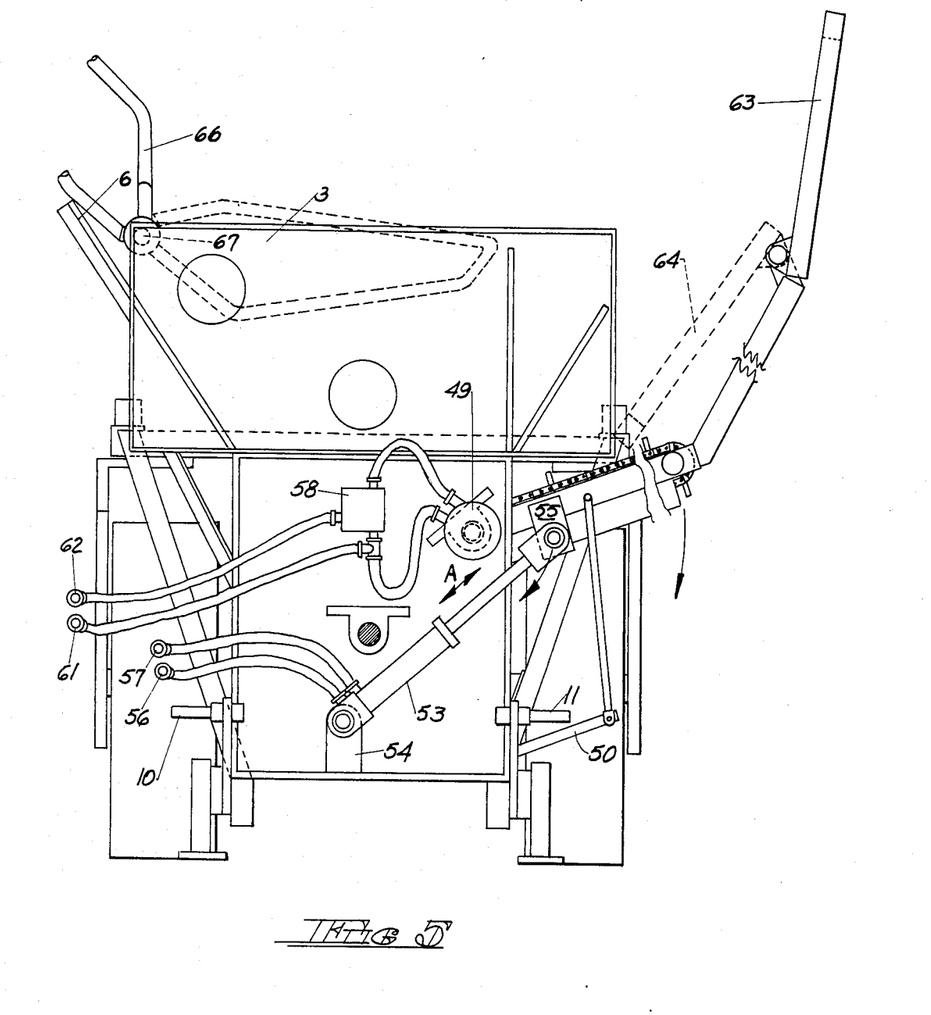
FIG. 5 is a front elevational view of the dispersing machine, showing the side panel in the raised position.
Figure 6:
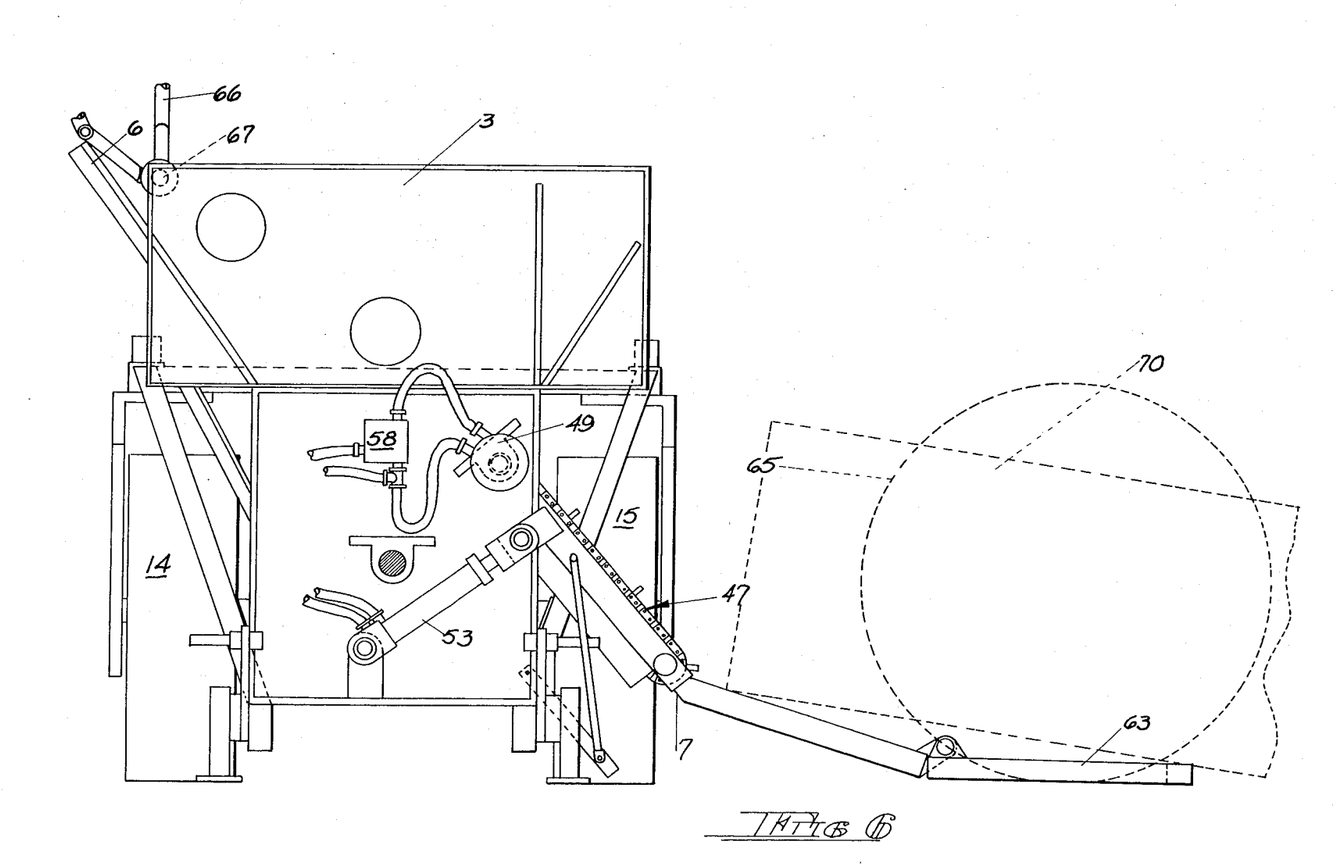
FIG. 6 is a front elevational view of the dispersing machine, showing the side panel in the lowered position.

In preparing to operate the dispersing machine 1, it is connected to the tractor 2 by a conventional hitch arrangement 2a and power take-off coupling 2b, as illustrated generally in FIG. 1. The movable side 7 would be in its raised position as shown in FIGS. 2 and 5 and the pick up arm 63 would be in its stowed position as indicated by the broken lines at 64 in FIG. 5.

To load a round bale of material in the dispersing machine 1, the machine 1 is driven just past the bale of material to be picked up. The movable side 7 is shifted to its lowered position and the pick up arm 63 is extended to its in use position, resulting in the configuration shown in FIG. 6, the round bale in the position of the broken line at 65. With the side 7 and pick up arm 63 essentially at ground level, the machine 1 is backed up toward the bale. The pick up arm 63 and outermost edge of the outer section 45 of the side 7 slide under the bale until the bale is approximately centrally positioned along the movable side 7. The hydraulic cylinder 53 is activated to raise the movable side 7, lifting the bale upwardly and into the machine 1 and is stopped when the inner panel 46 and conveyor 47 are approximately horizontal. At this point, the bale will be loaded in the machine, but not yet in contact with the grate 36 or rotor 26.

With the round bale now loaded into the machine 1, dispersion of the baled material can be commenced. The power take off of the tractor is activated which begins rotation of the rotor 26 in the direction indicated by arrow B as seen in FIG. 4. This rotation is at high speed, preferably in the neighborhood of 1000 rpm and inertia causes the hammers 29 to extend radially outward from the rotor 26. The conveyor 47 is started and moves in a direction indicated by arrow C (FIG. 4). The force of the projections 48 on the conveyor 47 and the impact of the hammers 29 cause the bale to tumble, or rotate continuously within the dispersing machine 1. As the bale rotates, a uniform layer, preferably ½" to ¾", of material is removed from the circumference of the bale by the hammers 29 of the rotor 26. The material thus removed from the bale is mixed with air and discharged in a uniform stream from the machine. The movable side 7 and the connected deflector 50 can be adjusted to vary the angle of discharge of the material, as desired.

The mode of operation is similar when large rectangular bales are to be dispersed. With the movable side 7 in its lowered position and the pick up arm 63 in the in use position (FIG. 6), the bale is set up on the machine 1 as indicated by the broken line at 70. The hydraulic cylinder 53 is activated to raise the movable side 7, lifting the bale upwardly and into the machine 1 to the fully loaded position shown by the broken line at 71 in FIG. 4. The rectangular bale is now cradled in the rack 66 and dispersion can be commenced. The power take off of the tractor is activated which begins rotation of the rotor 26. The conveyor 47 is started and moves in a direction indicated by arrow C. The force of the projections 48 peels off a layer of material from the bottom of the bale. This layer or "flake" of material is advanced by the conveyor 47 into the rotor 26. As explained previously, the material is mixed with air and discharged in a uniform stream from the machine 1.

As should now be apparent, the present invention provides a dispersing machine which is self-loading and capable of breaking up and scattering the material bound in large round bales. One skilled in the art will recognize that modifications can be made to the embodiment disclosed without departing from the spirit and purpose of the invention.

What is claimed is:

1. A machine for dispersing the material contained in large bales upon the ground or the like, comprising:
    a trough-shaped body having a front end, a rear end, a bottom, a stationary side and a movable side, wherein said movable side is pivotally connected between said front end and said rear end a fixed distance above said bottom forming a discharge opening;
    a supporting framework which unifies said trough-shaped body elements in such a manner that said framework and said trough-shaped body are not capable of independent movement, said framework having wheels near said rear end and means for hook-up of the machine to a tractor;
    a rotor centrally located near said bottom of said trough-shaped body, made up of a series of uniformly spaced, flat adjacent plates connected to a central shaft, tie rods connecting adjacent plates at positions equally distant about the periphery of said adjacent plates, hammer means pivotally connected to said tie rods between the adjacent plates and means for coupling said central shaft of said rotor to an external power source;

grate means overlying said rotor for holding the bale above said rotor while still allowing said hammers to pass therethrough to engage and break up the baled material; and lift means connected to said movable side for moving said movable side only between a lowered, pick-up position in which said movable side wall contacts said ground, and a raised, operational position.

2. The machine as claimed in claim 1 said movable side wall having an inner panel including a conveyor, which has external power supply means and engages the bale and advances it towards said grate means and said rotor.

3. The machine claimed in claim 2 including pick-up means attached to the movable side for engaging the bale to assist in lifting it into the machine.

4. The structure claimed in claim 3 wherein the pick up means comprises an L-shaped element pivotally connected to the movable side.

5. The machine claimed in claim 2 including deflector means attached beneath the movable side to direct the material as it discharges from the machine.

6. The structure claimed in claim 5 wherein the deflector means comprises an elongated rectangular panel pivotally connected between the front end and rear end, adjacent the bottom of the machine and linked to the movable side.

7. The machine claimed in claim 2 wherein the grate means comprises an elongated rectangular upper plate extending between the front end and rear end and attaching to the stationary side panel, a series of bars overlying the plates of the rotor, attaching at one end to the upper plate and at the other end to a lower support rod extending between the front end and the rear end.

8. The machine claimed in claim 2 including rack means adjacent to and extending above the stationary side for supporting and guiding a large rectangular bale as it is fed into the machine.

9. The machine claimed in claim 8 wherein the rack means is pivotally attached to the machine.

10. The machine claimed in claim 2 wherein the lift means comprises a hydraulic cylinder and piston powered by an external source and positioned between a base bracket on the framework and an outer bracket on the movable side.

11. The machine claimed in claim 2 wherein the hammer means comprises an elongated metal plate having a bore at its base end through which the tie rod passes and being slightly bent at its other end.

12. The machine claimed in claim 2 wherein the framework includes stands beneath the front end of the machine to support the machine when not otherwise supported.

13. The machine claimed in claim 12 wherein the plates of the rotor are circular.

14. The machine claimed in claim 12 wherein the plates of the rotor are rectangular and equivalent diagonals of adjacent plates are rotated 60° with respect to each other.

15. The machine claimed in claim 2 wherein the conveyor and the lift means have a common power source.

* * * * *